United States Patent [19]

Cupo

[11] Patent Number: 4,800,573
[45] Date of Patent: Jan. 24, 1989

[54] EQUALIZATION ARRANGEMENT

[75] Inventor: Robert L. Cupo, Eatontown, N.J.

[73] Assignees: American Telephone and Telegraph Company, New York, N.Y.; AT&T Information Systems Inc., Morristown, N.J.

[21] Appl. No.: 122,812

[22] Filed: Nov. 19, 1987

[51] Int. Cl.$^4$ ............................ H04B 3/04; H04J 1/14
[52] U.S. Cl. ..................................... 375/14; 370/69.1
[58] Field of Search ...................... 333/18; 375/12, 14, 375/15; 364/724; 370/69.1

[56] References Cited

U.S. PATENT DOCUMENTS

| | | | |
|---|---|---|---|
| 4,376,308 | 3/1983 | McNair | 375/14 |
| 4,384,355 | 5/1983 | Werner | 375/14 |
| 4,550,415 | 10/1985 | Debus, Jr. et al. | 375/14 |

Primary Examiner—Benedict V. Safourek
Attorney, Agent, or Firm—Ronald D. Slusky

[57] ABSTRACT

A voiceband data signal comprised of frequency-division-multiplexed primary and secondary channels is applied to the receiver portion of a modem. Circuitry within the modem for recovering the primary channel data includes an anti-aliasing filter, A/D converter, Hilbert filter, demodulator, fractionally-spaced equalizer, carrier recovery circuit and decision circuit. An error signal put out by the decision circuit is used by the equalizer to update its coefficients, and thus its transfer function. Rather than using a bandpass filter to remove the secondary channel energy prior to sampling and equalization, the receiver relies on the fractionally-spaced equalizer to suppress the secondary channel energy.

8 Claims, 2 Drawing Sheets

EQUALIZATION ARRANGEMENT

BACKGROUND OF THE INVENTION

The present invention relates to systems which use adaptive equalizers.

In voiceband and other data transmission systems, a so-called secondary channel signal, which carries diagnostics, maintenance, and other information, is often frequency-division-multiplexed with the primary channel signal which carries the users' data. Conventionally, bandpass filters have been used in the receiver portion of voiceband modems to remove, for example, the secondary channel energy from the received signal in order to equalize and otherwise process the primary channel and recover the data carried therein.

In general, this approach is satisfactory. However, as voiceband systems are designed with higher and higher bit rates, the requirements on the filter used to remove the secondary channel energy get more and more severe. This is because it becomes increasingly important for the primary channel signal to be passed undistorted through the filter. For example, in a voiceband data communication system transmitting data at 19.2 Kbps, it has been found that a 28th order filter is needed. Such a filter adds not insignificantly to the cost, power dissipation and circuit board area requirements of the modem.

SUMMARY OF THE INVENTION

When an adaptive equalizer is fractionally-spaced rather than synchronous, i.e., has "taps" that are spaced closer than the baud interval, rather than being spaced at the baud interval, then that equalizer will adapt to have a transfer function which, on the one hand, rejects energy in any frequency band region outside of the channel whose data the equalizer is adapting on while, on the other hand, maintaining an optimum or near-optimum transfer function within that channel. This being so, I have recognized that the filter traditionally used to remove, for example, the secondary channel energy prior to the received signal being presented to the primary channel equalizer is superfluous when the equalizer is fractionally-spaced, because in the absence of such filter, its function will be performed automatically by the equalizer itself. In accordance with the invention, then, the filter is simply not used.

Besides reducing the bulk, cost, etc., of systems that would otherwise use the bandpass filter, the present invention provides an improvement in the overall signal processing. This results from the fact that the heretofore-used bandpass filter—because it can never be ideal—itself constitutes a source of some, albeit relatively minor, impairment in the signal presented to the equalizer, thereby adding to the latter's processing burden. Advantageously, then, the elimination of the bandpass filter in accordance with the invention removes that source of signal impairment and allows the processing performed by the equalizer to be concentrated on the compensation for distortion induced by the transmission channel.

DETAILED DESCRIPTION

Figure 1:
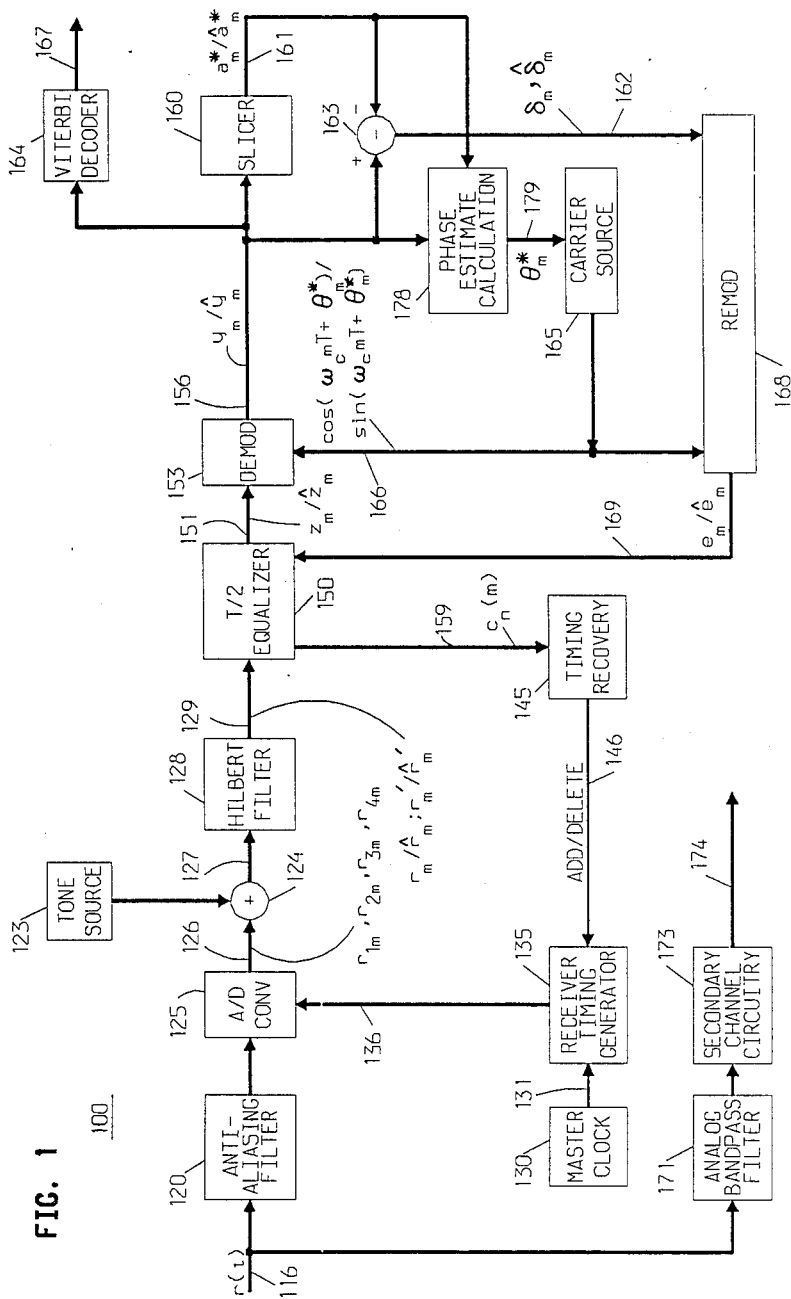
FIG. 1 is a block diagram of the receiver portion of a voiceband data modem embodying the principles of the invention.

Receiver 100 shown in FIG. 1 is adapted for use in a voiceband data modem.

Figure 2:
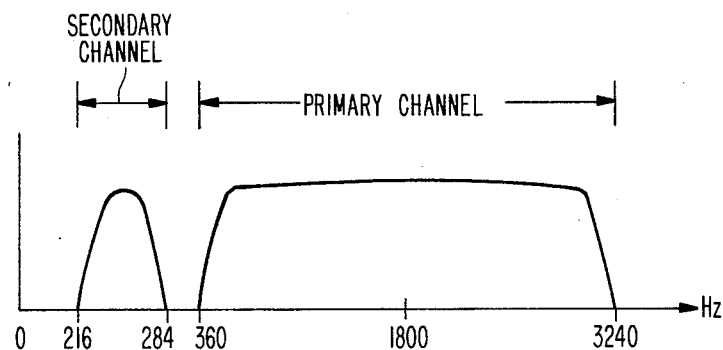
FIG. 2 shows the frequency spectrum of the signal illustratively received by the modem of FIG. 1.

In the transmitter (not shown), bits to be transmitted are received from the user in groups of twenty-eight. These bits are then trellis-coded into 8-dimensional signal points, or symbols. Each symbol is transmitted as four 2-dimensional quadrature carrier pulses in the course of four successive baud intervals of $T = 1/2742.8571$ sec. Thus the bits are communicated at a rate of $\frac{1}{4}T = 685.7142$ 8-dimensional symbols per second, yielding a binary data transmission rate of 19.2 Kbps, i.e., 19,200 bits per second. As shown in FIG. 2, this signal occupies the frequency band 360–3240 Hz centered about an 1800 Hz carrier frequency and is shaped to have 5% excess bandwidth. As also shown in FIG. 2, a stream of 110 bit-per-second secondary data representing diagnostic, maintenance or other information is modulated using frequency shift keying (FSK) into the frequency band 216–284 Hz and is shaped to have 25% excess bandwidth.

The transmitted signal, thus having energy in two frequency division multiplexed channels, is received by receiver 100 as signal $r(t)$ on lead 116 from which it is extended to two sections of the receiver. One of these sections is comprised of analog bandpass filter 171 and secondary channel circuitry 173. Filter 171 removes the primary channel energy from the received signal and passes the resulting filtered signal to secondary channel circuitry 173. The latter, in conventional manner, recovers the data carried in the secondary channel and provides it to diagnostic circuitry within the modem (not shown) on lead 174. The constraints on filter 171 are not particularly severe because the FSK signal carried in the secondary channel is easily demodulated by, for example, measuring the distance between its zero-crossings, an approach whose accuracy is not significantly compromised if, because filter 171 has a gentle rolloff, the secondary channel signal is somewhat corrupted by energy from the primary channel.

The other section of the receiver to which signal $r(t)$ extends comprises the remainder of the circuitry shown in FIG. 1 and is responsible for recovering the data carried in the primary channel, that data being ultimately provided by the receiver on lead 167. Conventionally, the received signal would be bandpass-filtered in order to remove the secondary channel signal energy prior to further processing. Disadvantageously, however, because of the high bit rate involved, such a filter, if used, would have to be quite complex, e.g., 28th order, in order to provide a sharp cutoff and thereby assure that (a) only a minimal amount of primary channel energy is lost and (b) only a minimal amount of secondary channel energy is leaked into the primary channel band.

In accordance with the invention, however, no such bandpass filtering is performed. Rather, the operation of fractionally-spaced equalizer 150, described below, is relied upon to effectively provide the bandpass filtering function. At this point, then, $r(t)$ is simply passed through an anti-aliasing filter 120. Filter 120 is a low-pass filter which filters out energy in the signal $r(t)$ at frequencies nominally above 4 KHz. Such energy would otherwise be reflected into the primary channel signal after sampling by A/D converter 125. As with filter 171, the parameters of filter 120 are non-critical and thus the filter can be implemented with but a few simple components.

Receiver 100 further includes a master clock 130, which generates 4096 master clock pulses every T seconds on lead 131. These are received by receiver timing generator 135, which counts the pulses on lead 131 and generates timing signals on a number of output leads to control the sequencing of the various signal processing functions within the receiver. One of these leads, shown explicitly, is lead 136. The latter extends pulses to A/D converter 125 at a rate which causes A/D converter 125 to generate line samples of the received signal at 4/T samples per second. A/D converter 125 thus generates on its output lead 126 during the $m^{th}$ receiver baud interval four passband line samples $r_{1m}$, $r_{2m}$, $r_{3m}$ and $r_{4m}$. These samples contain substantial energy from both the primary and secondary channels, with the secondary channel energy being substantially unattenuated relative to the energy in the primary channel. The passband line samples on lead 126 are passed to Hilbert filter 128 by way of an adder 124 (whose function is discussed hereinbelow) and lead 127. For each baud interval, Hilbert filter 128 generates on lead 129 digital Hilbert transform pair $r_m/\hat{r}_m$ and digital Hiblert transform pair $r'_m/\hat{r}'_m$. Thus, a Hilbert transform pair appears on lead 129 once every T/2 seconds.

The Hilbert transform pairs on lead 129 are passed to finite-impulse-response equalizer 150 of conventional design. Since the equalizer receives and processes more than one input for each baud interval, it is referred to as a "fractionally-spaced" equalizer. It is, more specifically, referred to as a T/2 type of fractionally-spaced equalizer since it receives and processes inputs at a rate of two per baud interval. The outputs of equalizer 150 on lead 151 are generated once per baud interval and are, respectively, the real and imaginary components $z_m$ and $\hat{z}_m$ of a passband equalizer output $Z_m$.

The components of passband equalizer output $Z_m$ pass to demodulator 153 which receives the values of cos $(\omega_c mT + \theta_m)$ and sin $(\omega_c mT + \theta_m^\#)$ from carrier source 165 on lead 166 and generates on lead 156 a complex phase-corrected baseband signal $Y_m$. Here, $\theta_m$ is a carrier phase correction estimate (generated as described below), which takes account of discrepancies in the phase of the carrier signal generated by carrier source 165 with respect to the modulating carrier signal in the transmitter. Such discrepancies are due, for example, to transmitter/receiver frequency differences, transmitter/receiver carrier phase differences, channel-induced phase offset, etc.

$Y_m$ has real and imaginary components $y_m$ and $\hat{y}_m$, which are fed into a conventional Viterbi decoder 164. The latter operates on each successive group of four complex outputs on lead 156—each such group representing a single received 8-dimensional signal point—to determine what the most likely transmitted 8-dimensional point was and thereby recover the twenty-eight bits represented thereby. Those bits are thereupon provided on lead 167.

Both equalizer 150 and carrier recovery circuit 153 use as an input an error signal indicative of the difference between the phase-corrected signals $Y_m$ on lead 156 and decisions thereafter made in the receiver as to what the transmitted signal points actually were. The most accurate way to generate that error is to use the decisions made in Viterbi decoder 164. However, there is a significant delay, e.g., 70 baud intervals, in Viterbi decoder 164. As a result, using the decisions formed in Viterbi decoder 164 would, for example, necessitate the use of a smaller step size in the equalizer coefficient updating relations (the factor $\beta$ in Eqs. (2) and (3) hereinbelow) than one would otherwise like. This, in turn, would reduce the responsiveness of the equalizer.

As an alternative, receiver 100 includes a slicer 160 which provides on its output lead 161 quantized versions of $y_m$ and $\hat{y}_m$, denoted $a_m$ and $\hat{a}_m$. These so-called "soft" or "tentative" decisions may occasionally vary from the corresponding decisions ultimately arrived at in Viterbi decoder 164 as to the values of the corresponding two components of a particular 8-dimensional signal point. The tentative decisions are, however, a sufficiently accurate measure of what the final decisions will be that they can be advantageously used for equalizer and carrier recovery error generation. To this end, a subtractor 163 provides on its output lead 162 the real and imaginary components of a complex baseband error signal $\delta_m$ having real and imaginary components $\delta_m$ and $\hat{\delta}_m$, where $\delta_m = (y_m - a_m)$ and $\hat{\delta}_m = (\hat{y}_m - \hat{a}_m)$. The complex baseband error signal $\Delta_m$ is modulated into the passband by remodulator 168 which, like demodulator 153, receives the carrier signal on lead 166. The remodulator output is complex passband error signal $E_m$ having real and imaginary components $e_m$ and $\hat{e}_m$, which are supplied to equalizer 150 for the purpose of coefficient updating. The input and output of slicer 160 are also supplied to phase estimate calculation circuit 178, which, in conventional fashion, supplies carrier phase estimate $\theta_m$ mentioned above.

In particular, for each baud interval, equalizer 150 multiplies the (2M+2) newest, i.e., most-recently-formed, passband samples applied thereto by respective complex coefficients stored therein and forms the sum of the resulting products to form equalizer output $Z_m$ in accordance with $$Z_m = \sum_{i=-M/2}^{M/2} [C_{2i-1}(m)R_{m-i+1} + C_{2i}(m)R'_{m-i+1}]. \quad (1)$$

In Eq. (1), the $C_i(m)$'s are complex-valued coefficients each having a particular value associated with the $m^{th}$ receiver baud interval. Each odd-indexed coefficient $C_1(m)$, $C_3(m)$, etc., is multiplied by a respective one of the "unprimed" samples $R_m$, $R_{m-1}$, etc., while each even-indexed coefficient $C_2(m)$, $C_4(m)$, etc., is multiplied by a respective one of the "primed" samples $R'_m$, $R'_{m-1}$, etc. The values of the entire ensemble of coefficients at any point in time define the transfer function of the equalizer, so that updating the coefficient values updates the equalizer transfer function.

Upon having generated $Z_m$ in accordance with Eq. (1), equalizer 150 thereupon updates the coefficient values stored therein to provide coefficient values associated with the $(m+1)^{st}$ baud interval. The updating rules illustratively used are $C_{2i-1}(m+1) = C_{2i-1}(m) - \beta E_{m-i-d+1} - \gamma[C_{2i-1}(m)]$ (2)

$$C_{2i}(m+1) = C_{2i}(m) - \beta E_{m-i-d+1}\gamma[C_{2i}(m)] \quad (3)$$

where $\beta$ and $\gamma$ are selected constants. The parameter d is a predetermined number—illustratively equal to unity—whose introduction into the updating rules takes account of the delay between generation of passband samples $R_m$ and $R'_m$ and the generation of error signal $E_m$. The updating rules of Eqs. (2) and (3) embody the so-called stochastic mean-squared error updating algorithm, with the final term in each of these equations representing so-called "tap leakage".

The updated coefficient values, in addition to being used internally within equalizer 150, are passed on lead 159 to timing recovery circuit 145. The latter determines whether receiver timing should be advanced or retarded (if either) and provides a signal indicative of same on add/delete lead 146, which extends to receiver timing generator 135. The latter, in turn, then appropriately adjusts the phase of the pulses on lead 136, and, therefore, the phase with which the samples on lead 126 are formed, by either deleting (ignoring) one of the clock pulses on lead 131 or adding an extra one, depending on whether receiving timing is to be advanced or retarded. Timing recovery circuit may, for example, utilize the technique disclosed in U.S. Pat. No. 4,334,313 issued June 8, 1982 to R. D. Gitlin et al or (with a reversal in the order of equalization and demodulation) that disclosed in the copending U.S. patent application of R. L. Cupo et al, Ser. No. 113,973 filed Oct. 29, 1987, entitled "Equalizer-Based Timing Recovery".

Figure 3:
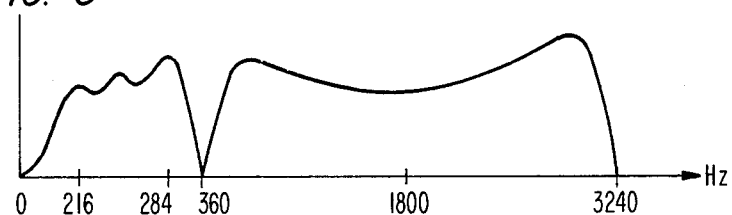
FIGS. 3 and 4 show equalizer transfer functions helpful in explaining the operation of the invention.

Turning, now, to an explanation of the principles underlying the invention, let us assume that at some point in time after equalizer 150 has had a chance to "learn" the transmission channel, its transfer function is as shown in FIG. 3. The shape of the transfer function within the primary channel is, therefore, that needed to optimally equalize the primary channel. Assume, further that there is currently no energy in the secondary channel. Under these circumstances, the equalizer will take on some (typically non-zero) transfer function within the secondary region, which transfer function takes on a shape which is fairly arbitrary since there is no secondary channel energy to suppress.

Assume that with the equalizer having the transfer characteristic of FIG. 3, energy now appears in the secondary channel and that that energy is not filtered out before being passed to the A/D converter. Since the transfer function of the equalizer is non-zero in the secondary channel region, a significant amount of the secondary channel energy will initially pass through the equalizer, thereby corrupting its output signal and causing an increase in the error signal on lead 162. The equalizer, responsive to that increased error, will adapt its coefficients in such a way as to reduce it, meaning that it must develop, or try to develop, a null in the secondary channel region.

If equalizer 150 were to be a synchronous equalizer, a problem would arise at this point because in a synchronous equalizer, one set of tap coefficients provides the optimum "solution" for the primary channel, i.e., provides the smallest primary channel mean-squared error and thus the optimum error rate for the primary channel data. It is highly unlikely, however, that the set of tap coefficients that the equalizer will arrive at in attempting to create the aforementioned null will be the one that provides the aforementioned optimum solution. The primary channel transfer characteristic will thus be less than optimum and error performance will suffer. In addition, because the received signal is sampled at the baud rate, any secondary channel energy passed into the A/D converter will be aliased into the primary channel. Thus, even if the equalizer were able to create an acceptable transfer characteristic in both channels, such aliased energy would constitute a significant primary-channel-signal corrupting factor.

Since equalizer 150 is a fractionally-spaced equalizer, however, neither of the above is a problem.

Firstly, the samples applied to the equalizer are typically provided at at least the Nyquist rate and thus the above-mentioned aliasing problem does not occur.

Figure 4:
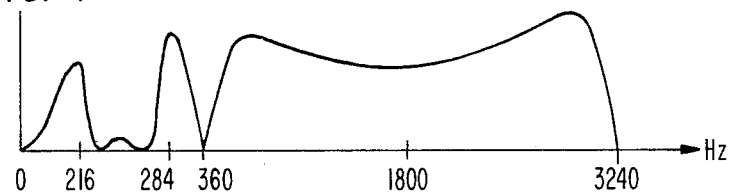

Additionally, in a fractionally-spaced equalizer, many sets of coefficient values provide approximately the same mean-squared error. Thus the shape of the transfer function within the secondary channel region as shown in FIG. 3 is but one of virtually limitless set of possibilities, again under the assumption that there is no secondary channel energy present. Thus in the presence of secondary channel energy, the fractionally-spaced equalizer is able to create nulls in the secondary channel region without deleteriously affecting the primary channel characteristic. This is shown in FIG. 4, which represents the equalizer transfer function at a time subsequent to the appearance of the secondary channel energy and after the equalizer has had an opportunity to adapt its coefficients. Note that although the equalizer has now created a null in the secondary channel region, thereby effectively providing, in accordance with the present invention, the bandpass filtering function that would otherwise have been provided by a separate bandpass filter, the transfer characteristic in the primary channel region remains virtually unchanged. Again, this is a consequence of the fact that there is no one particular set of coefficient values needed to optimally equalize the primary channel.

Returning, now to FIG. 1, we are now in a position to discuss adder 124. In a system in which the secondary channel energy is not always present but, rather, comes and goes, there is a possibility that from a transfer characteristic of the type shown in FIG. 4, i.e., with a null in the secondary channel region, the equalizer might, in the course of its ongoing adaptation, take on a transfer characteristic that is more like that of FIG. 3, thereby creating a problem when the secondary channel energy suddenly returns.

In order to deal with this situation, a tone source 123 provides, in digital form, tones at the mark and space frequencies of the secondary channel FSK signal. These are added to the output of A/D converter 125 by adder 124, thereby assuring that there is always some energy in the secondary channel region of the signal presented to equalizer 150, even when no actual secondary channel energy is being transmitted. This, in turn, ensures that the transfer function of the equalizer will remain as shown in FIG. 4.

The foregoing merely illustrates the principles of the invention. For example, the invention is not limited to equalizers having T/2 tap spacing but any fractional tap spacing. Additionally, although the invention is disclosed herein in the context of a passband fractionally-spaced equalizer, it is equally applicable to arrangements in which a baseband fractionally-spaced equalizer is used. Moreover, although the invention is disclosed herein in the context of a voiceband modem, it is equally applicable to virtually any signal processing environment in which a fractionally-spaced equalizer is, or could be, used. Nor is use of the invention limited to the herein-disclosed type of signal, i.e., FSK secondary channel signal, to be filtered out by the equalizer. And, of course, use of the invention does not depend on the particular modulation scheme, if any, used in the system nor the bit or baud rates.

Moreover, although the invention is disclosed herein in an environment in which the various signal processing functions are performed by discrete functional blocks, any one or more of these functions could equally well be performed by one or more appropriately programmed microprocessors, microcoded digital signal processing chips, etc.

It will thus be appreciated that those skilled in the art will be able to devise numerous arrangements which, although not explicitly shown or described herein, embody the principles of the invention.

What is claimed is:

1. Apparatus comprising
    means for receiving a signal transmitted to said apparatus over a communication channel, the transmitted signal being comprised of first and second frequency multiplexed signals, the energy in said first frequency multiplexed signal representing a stream of data,
    a fractionally-spaced equalizer,
    means for forming samples of the received signal at a rate less than the Nyquist frequency associated with said transmitted signal and for applying said samples to said equalizer in such a way that, in said samples, at the input of said equalizer, the energy derived from said second frequency multiplexed signal is substantially unattenuated relative to the energy derived from said first frequency multiplexed signal, said equalizer generating an equalized signal in response to said samples, and
    means for forming, in response to said equalized signal, decisions as to the values of said data, said equalizer updating its transfer function in response to said equalized signal and said decisions.

2. The invention of claim 1 wherein said second frequency multiplexed signal is intelligence-bearing.

3. Apparatus comprising
    means for receiving a signal transmitted to said apparatus over a communication channel, the transmitted signal being comprised of first and second frequency multiplexed signals, the energy in said first frequency multiplexed signal representing a stream of data,
    means for forming samples of the received signal at a rate less than the Nyquist frequency associated with said transmitted signal, said samples containing substantial energy from both of said first and second frequency multiplexed signals,
    a fractionally-spaced equalizer for generating an equalized signal in response to said samples, and
    means for forming, in response to said equalized signal, decisions as to the value of said data, said equalizer updating its transfer function in response to said equalized signal and said decisions.

4. The invention of claim 3 wherein said data is represented by data symbols occurring at a rate of 1/T symbols per second, T being a predetermined symbol interval, and wherein said equalizer generates said equalized signal by summing the products of a plurality of coefficients with respective signals derived from ones of said samples, said respective signals occurring at a rate greater than 1/T per second.

5. Apparatus comprising
    means for receiving a signal transmitted to said apparatus over a communication channel, the transmitted signal being comprised of first and second frequency multiplexed signals, the energy in said first frequency multiplexed signal representing a stream of signalling pulses occurring at a rate of 1/T per second, T being a predetermined baud interval,
    means for forming samples of said receiving signal at a rate greater than 1/T samples per second, but less than the Nyquist frequency associated with said transmitted signal, without removing any significant portion of the energy in said second frequency multiplexed signal relative to the energy in said first frequency multiplexed signal,
    fractionally-spaced equalizer means for forming an equalized signal associated with each one of said signalling pulses, said equalized signal being a function of the products of signals derived from ones of said samples with respective ones of a plurality of coefficients which have respective values associated with said equalized signal,
    means for forming, in response to the equalized signals formed by said fractionally-spaced equalizer means, decisions as to the values of data symbols represented by said signalling pulses, and
    means for updating the values of said pluality of coefficients for use by said equalizer means in the forming of an equalized signal associated with a subsequent one of said data symbols.

6. A method comprising the steps of
    receiving a signal transmitted over a communication channel, the transmitted signal comprised of first and second frequency multiplexed signals, the energy in said first frequency multiplexed signal representing a stream of data,
    forming samples of said received signal at a rate less than the Nyquist frequency associated with said transmitted signal, said samples containing substantial energy from both of said first and second frequency multiplexed signals,
    generating in a fractionally-spaced equalizer an equalized signal in response to said samples,
    forming, in response to said equalized signal, decisions as to the values of said data, and
    updating the transfer function of said equalizer in response to said equalized signal and said decisions.

7. The invention of claim 6 wherein said data is represented by data symbols occurring at a rate of 1/T symbols per second, T being a predetermined symbol interval, and wherein said generating step includes the step of summing the products of a plurality of coefficients with respective signals derived from ones of said samples, said respective signals occurring at a rate greater than 1/T per second.

8. A method comprising the steps of
    receiving a signal transmitted over a communication channel, the transmitted signal comprised of first and second frequency multiplexed signals, the energy in said first frequency multiplexed signal representing a stream of data symbols occurring at a rate of 1/T symbols per second, T being a predetermined symbol interval,
    forming samples of said received signal at a rate greater than 1/T samples per second, but less than the Nyquist frequency associated with said transmitted signal, without removing any significant portion of the energy in said second frequency multiplexed signal relative to the energy in said first frequency multiplexed signal,
    forming an equalized signal associated with an individual one of said data symbols, said equalized signal being a function of the products of ones of said samples with respective ones of a plurality of coefficients which have respective values associated with said one of said data symbols, forming, in response to said equalized signal, a decision as to the value of said one of said data symbols and an error signal indicative of the difference between said equalized signal and said decision, and updating the values of said plurality of coefficients for use in said equalized signal forming step in the forming of an equalized signal associated with a subsequent one of said data symbols.

* * * * *

UNITED STATES PATENT AND TRADEMARK OFFICE
CERTIFICATE OF CORRECTION

PATENT NO. : 4,800,573
DATED : January 24, 1989
INVENTOR(S) : Robert L. Cupo

It is certified that error appears in the above-identified patent and that said Letters Patent is hereby corrected as shown below:

Column 3, line 27 "Hiblert" should read --Hilbert--".

Column 3, line 43 "$(\omega_c mT+0_m)$" should read -- $(\omega_c mT+0_m^*)$ --.

Column 4, line 11 "$a_m$ and $\hat{a}_m$" should read -- $a_m^*$ and $\hat{a}_m^*$ --.

Column 4, line 24 "$(y_m - a_m)$" should read -- $(y_m - a_m^*)$ --.

Column 4, line 34 "$0_m$" should read -- $(0_m^*)$ --.

Column 4, lines 60 and 61 "$C_{2i-1}(m + l) = C_{2i-1}(m) - \beta E_{m-i-d+l} - \gamma[C_{2i-1}(m)]$" should read -- $C_{2i-1}(m + 1) = C_{2i-1}(m) - \beta E_{m-d} R_{m-i-d+1} - \gamma[C_{2i-1}(m)]$ (2) --.

Column 4, line 63 "$C_{2i}(m + 1) = C_{2i}(m) - \beta E_{m-i-d+l} \gamma[C_{2i}(m)]$" should read -- $C_{2i}(m + 1) = C_{2i}(m) - \beta E_{m-d} R'_{m-i-d+1} - \gamma[C_{2i}(m)]$ (3) --

Signed and Sealed this

Thirteenth Day of February, 1990

Attest:

JEFFREY M. SAMUELS

Attesting Officer  Acting Commissioner of Patents and Trademarks